2,889,245

METHOD OF DISINFECTING SEED GRAIN BY APPLYING A COMPOSITION COMPRISING AN HYDROXYL AROMATIC DIAZO DERIVATIVE

Wilhelm Bonrath, Leverkusen-Bayerwerk, and Ewald Urbschat, Koln-Mulheim, Germany, assignors to Farbenfabriken Bayer Aktiengesellschaft, Leverkusen, Germany, a corporation of Germany No Drawing. Application May 18, 1955, Serial No. 509,414. In Germany July 6, 1949

Public Law 619, August 23, 1954
Patent expires July 6, 1969

3 Claims. (Cl. 167—30)

The present invention relates to useful improvements in seed grain disinfectants; more particularly it is concerned with azo compounds which are useful for rendering seed grain immune against attacks by fungi.

Diazo compounds containing phenolic hydroxyl groups are known to exert fungicidal activity and are especially useful for dressing seed grain.

It is an object of the present invention to provide new seed grain disinfectants of increased fungicidal potency.

Further objects will become apparent as the following description proceeds.

In accordance with the present invention it has been found that azo compounds of the general formula

or

wherein R stands for a mono- or multi-nuclear aromatic radical, $R_1$ for hydrogen or an organic radical; R and $R_1$ may be substituted; $R_1$ is attached to X through a carbon-to-carbon linkage or through a hetero atom such as O, N or S; X stands for one of the groups:

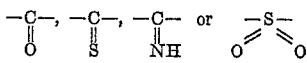

and $n$ stands for an integer.

The properties of the aforedefined azo compounds are superior to those of the previously used diazo compounds containing phenolic hydroxyl groups. The azo compounds of the invention show an improved fungicidal efficacy and increased toxicity. Therefore, they are highly potent seed grain disinfectants.

The azo compounds of the invention are obtainable by conventional methods, for instance by condensation of quinones with mono- or polycarboxylic acid, mono- or polyhydrazides, thiocarboxylic acid hydrazides, sulfonic acid hydrazides, semicarbazides, thiosemicarbazides, or aminoguanidines.

Suitable quinone components according to the invention are paraquinone, toluquinone, naphthoquinones, anthraquinones, phenanthrenequinones or substitution products thereof.

Examples of hydrazides which are useful for condensation with the quinone component are benzoic acid hydrazides, alkylbenzoic acid hydrazides, halogenobenzoic acid hydrazides, nitrobenzoic acid hydrazides, aminobenzoic acid hydrazide, dimethylaminobenzoic acid hydrazide, hydroxybenzoic acid hydrazide, alkoxybenzoic acid hydrazide, phenoxybenzoic acid hydrazide, formic acid hydrazide, acetic acid hydrazide, cyanoacetic acid hydrazide, propionic acid hydrazide, valeric acid hydrazide, lauric acid hydrazide, crotonic acid hydrazide, cinnamic acid hydrazide, hydroxybutyric acid hydrazide, hydroxyisovaleric acid hydrazide, hydroxyacetic acid hydrazide, alkoxyacetic acid hydrazides, phenoxyacetic acid hydrazides, thioacetic acid hydrazide, methylthioacetic acid hydrazide, alkylcarbonic acid hydrazides, phenylcarbonic acid hydrazide, phenylacetic acid hydrazide, naphthoic acid hydrazide, naphthylacetic acid hydrazide, pyromucic acid hydrazide, carbohydrazide, thiocarbonic acid hydrazide, oxalic acid dihydrazide, malonic acid dihydrazide and succinic acid hydrazide.

Condensation products of quinones with aminoacetic acid hydrazide, methylaminoacetic acid hydrazide, dimethylaminoacetic acid hydrazide, trimethylammoniumchloride-acetic acid hydrazide or pyridinium chloride-acetic acid hydrazide, may be employed in the form of their salts, for instance as chlorides, nitrates, phosphates, dithiocarbamates, thiocyanates, dinitrophenolates, or pentachlorophenolates.

The products obtainable from quinones and semicarbazide, phenylsemicarbazide, thiosemicarbazide, phenylthiosemicarbazide, dithiocarbazinic acid esters, aminoguanidine and benzoic sulfonic acid hydrazide are also suitable according to the invention.

The above named compounds are given only by way of illustration but it shall be understood that the scope of the invention shall by no means be restricted to the use of these compounds.

The compounds obtained by reacting carboxylic acid hydrazides and benzoquinone have proved to exert an especially high potency for rendering seed grain immune against attacks by fungi. An additional advantage of these reaction products is that the starting materials used to produce them are readily available.

For the purpose of seed disinfection, the azo compounds of the invention are applied in the usual manner either as such or after addition of the customary diluents or inert materials. They may also be applied in admixture with other fungicides or insecticides, for instance arsenic and mercury compounds, or trace elements and they may contain substances preventing birds from picking up seed grain, or products improving their solubility or dipersibility or otherwise favourably affecting their properties. Examples of such other fungicides and insecticides are disinfectants containing metal, insecticidal and fungicidal phosphoric acid esters, insecticidal and fungicidal chlorinated hydrocarbons, for instance hexachlorocyclohexane, dichlorodiphenyl-tricholor ethane, hexachlorobenzene, chlorinated quinone diene addition products. As trace elements which may be used as additives to the new disinfectants there may be named copper, manganese, cobalt and molybdenum.

The most various diluents are suitable for the application of the disinfectants in solution. As solvents there may be used for instance water, alcohols, hydrocarbons, chloroform, tetrachloromethane and acetone. Examples of suitable inert materials are talcum, chalk, bentonite and pulverized rock.

The invention is further illustrated by the following examples without being restricted thereto.

*Examples*

(1) A dry disinfectant containing 30% of p-chlorobenzoylazophenol and 70% of talcum was applied to barley infected with leaf stripe (*Helmintosporium graminum*) in a quantity of 2 g. to 1 kg. of seed. The speed thus treated showed no attack at all whereas untreated seed showed an attack of 4.5%.

(2) A formulation containing 20% of p-chlorobenzoylazophenol and 80% of talcum was applied to rye seed grain infected with Fusarium disease (*Fusarium nivale*) in a quantity of 2 g. to 1 kg. of seed. The seed yielded 69% of healthy plants and 0.3% of plants with disease symptoms whereas untreated seed produced 15.5% of healthy plants and 9.6% of sick plants.

(3) The formulation of Example 2 applied in a quantity of 1 g. to 1 kg. of seed was found to be capable of entirely preventing germination of stripe smut spores (*Urocystis occulta*) on rye.

(4) By dressing oat seed grain infected with loose smut (*Ustilago avenae*) with the formulation of Example 2 in a quantity of 1 g. to 1 kg. of seed the attack was completely overcome whereas untreated seed grain resulted in 9.7% of plants sick with loose smut (*Ustilago avenae*).

(5) A dry disinfectant containing 10% of p-chlorobenzoylazophenol and 0.75% of Hg in the form of phenyl Hg- acetate, the balance being talcum, was used to dress oat seed grain infected with loose smut (*Ustilago avenae*) in varying quantities (see below).

| Disinfectant in g. | Seed grain in kg. | Attack in Percent |
|---|---|---|
| 1 | 1 | 0 |
| 2 | 1 | 0 |
| 3 | 1 | 0 |

In comparison therewith, untreated oat seed grain infected with loose smut (*Ustilago avenae*) yielded 11.7% of sick plants.

(6) By dressing rye infected with Fusarium disease (*Fusarium nivale*) with a formulation containing 30% of acetylazophenol and 70% of talcum in a quantity of 1.5 g. to 1 kg. of seed, 81.3% of healthy plants and 5% of sick plants were obtained. Untreated rye seed grain produced 60% of healthy plants and 18% of sick plants.

(7) By applying the formulation of Example 6 to wheat seed grain infected with stinking smut (*Tilletia tritici*) in a quantity of 1 g. to 1 kg. of seed, the germination of smut spores was completely prevented.

(8) The formulation of Example 6 was applied to oat seed grain infected with loose smut (*Ustilago avenae*) in a quantity of 1 g. to 1 kg. of seed. No attack occurred whereas untreated seed grain showed an attack of 8%.

(9) A formulation consisting of 30% of benzoylazocresol and 70% of talcum proved to completely eliminate loose smut of oats (*Ustilago avenae*) when applied in a quantity of 3 g. to 1 kg. of seed. Untreated seed grain infected with *Ustilago avenae* showed an attack of 7.9%.

(10) Oat seed grain infected with loose smut (*Ustilago avenae*) was dressed with a mixture consisting of 30% of chlorocresyl hydroxyacetylazophenol and 70% of talcum in varying quantities.

| Disinfectant in g. | Seed grain in kg. | Attack in Percent |
|---|---|---|
| 1 | 1 | 0 |
| 2 | 1 | 0 |
| 3 | 1 | 0 |

In comparison therewith, untreated oat seed grain infected with loose smut (*Ustilago avenae*) yielded 6.3% of sick plants.

(11) A disinfectant containing 30% of hydroxyallylazophenol and 70% of talcum was applied to oat seed grain infected with loose smut (*Ustilago avenae*). The disease was completely prevented whereas untreated seed grain showed an attack of 11.7%.

(12) A dry disinfectant containing 30% of benzoylazophenol and 70% of talcum was applied to barley seed grain infected with leaf stripe (*Helmintosporium graminum*) in varying quantities (see below).

| Disinfectant in g. | Seed grain in kg. | Attack in Percent |
|---|---|---|
| 1 | 1 | 0 |
| 2 | 1 | 0 |
| 3 | 1 | 0 |

In comparison therewith, untreated oat seed grain infected with loose smut (*Ustilago avenae*) yielded 12.5% of sick plants.

We claim:

1. The process of controlling fungi infestation of seed grain, which comprises applying to the seed grain a fungicidal composition containing as an active ingredient an azo compound having the following general formula $$(HO-R-N=N-X)_n R^1$$

in which R is a member selected from the group consisting of mono-, di- and tri-nuclear aromatic radicals, $R^1$ is a radical selected from the group consisting of hydrogen, monocyclic aromatic, naphthyl, alkyl, substituted alkyl, alkenyl, substituted alkenyl, O-alkyl, O-aryl and carboxyl radicals, X is a radical selected from the group consisting of

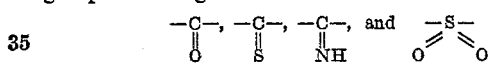

and n is an integer from 1 to 2, both inclusive.

2. The process of controlling fungi infestation of seed grain, which comprises applying to the seed grain a fungicidal composition containing as an active ingredient an azo compound having the following general formula $$HO\text{-phenyl-}N=N-COR^1$$

wherein $R^1$ is a phenyl radical.

3. The process of controlling fungi infestation of seed grain, which comprises applying to the seed grain a fungicidal composition containing as an active ingredient an azo compound having the following general formula $$HO\text{-phenyl-}N=N-COR^1$$

in which $R^1$ is a lower alkyl radical.

References Cited in the file of this patent

UNITED STATES PATENTS

| 2,054,062 | Bonrath et al. | Sept. 15, 1936 |
| 2,785,101 | Urbschat et al. | Mar. 12, 1957 |

FOREIGN PATENTS

| 831,785 | Germany | Feb. 18, 1952 |

OTHER REFERENCES

Ber. Deut. Chem., Band 16 (1933), pp. 132 and 149.